United States Patent Office 3,664,783
Patented May 23, 1972

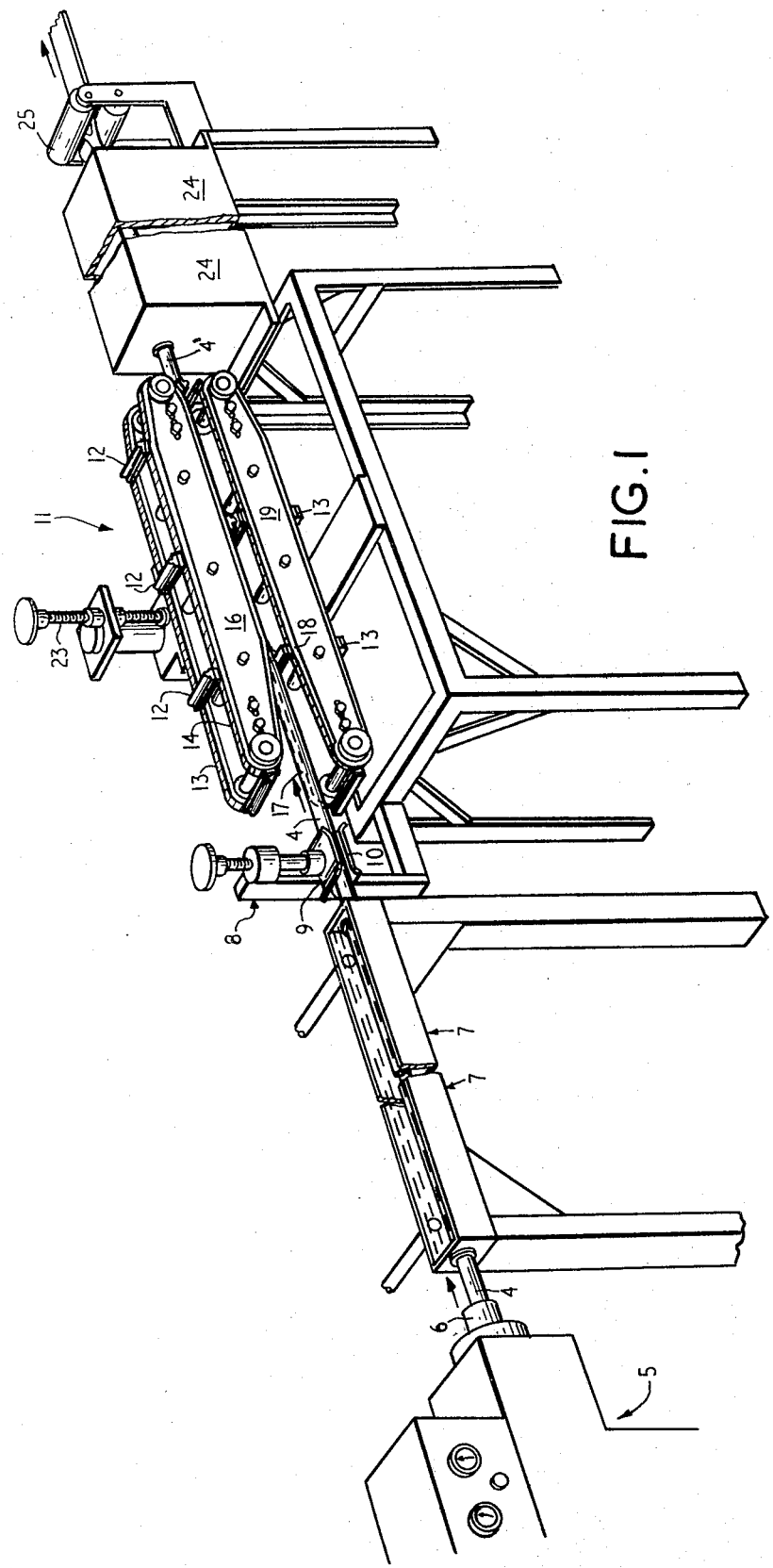

3,664,783
APPARATUS FOR THE PRODUCTION
OF TUBING
Dudley Stuart Murray, 592 Old Northern Road,
Dural, New South Wales 2158, Australia
Filed Aug. 28, 1969, Ser. No. 853,662
Claims priority, application Australia, Aug. 30, 1968,
42,767/68
Int. Cl. B29d 23/04
U.S. Cl. 425—71                                    8 Claims

ABSTRACT OF THE DISCLOSURE

Apparatus for maintaining a difference in internal pressure levels between adjacent portions of the path of an advancing flexible tube. The apparatus includes a plurality of clamping means which successively engage with the tube and move with it as it passes from one portion of its path to the next. At least one of the clamping means is in engagement with the tube at any instant. The clamping means may comprise opposed pressure pads on endless conveyors moving alongside the tube.

This invention concerns improvements in or relating to the production of tubing under internal fluid pressure.

A particular application of the invention will be in the continuous production of contractile plastics tubing.

If a body of polyvinyl chloride or other suitable thermoplastic material is preformed in expanded form at a temperature below the point of free-flow, the body so formed is "heat unstable" and, if again subjected to sufficient heat, will contract to a heat-stable unexpanded form. This property has a variety of applications, such as in the covering of cycle handles, condensers, braided hose, tubing and many other articles.

In the past contractile polyvinyl chloride tubing has been made by expanding polyvinyl chloride tubing under heat and internal pressure and cooling while so expanded so that it sets in a stressed condition. The tubing in stressed condition can be slipped over an article to be covered and then subjected to sufficient heat to shrink the tubing on the article.

To enable the continuous production of such tubing a way must be found of effectively controlling the internal pressure of a continuously advancing tube along different portions of its path, and this is the concern of the present invention.

One object of the present invention is the provision of a method for the continuous production of plastics contractile tubing.

The invention will find a general application however, whenever it is necessary to maintain a flexible advancing tube at different pressures along different portions of its path.

According to one general form of the invention there is provided apparatus for maintaining a difference in internal pressure levels between adjacent portions of the path of an advancing flexible tube, said apparatus including a plurality of clamping means adapted to successively engage the tube and move with the tube between said adjacent portions of its path with at least one of said clamping means in engagement with the tube at any instant.

Figure 3:
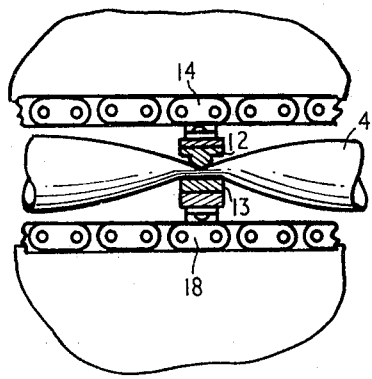
Figure 2:
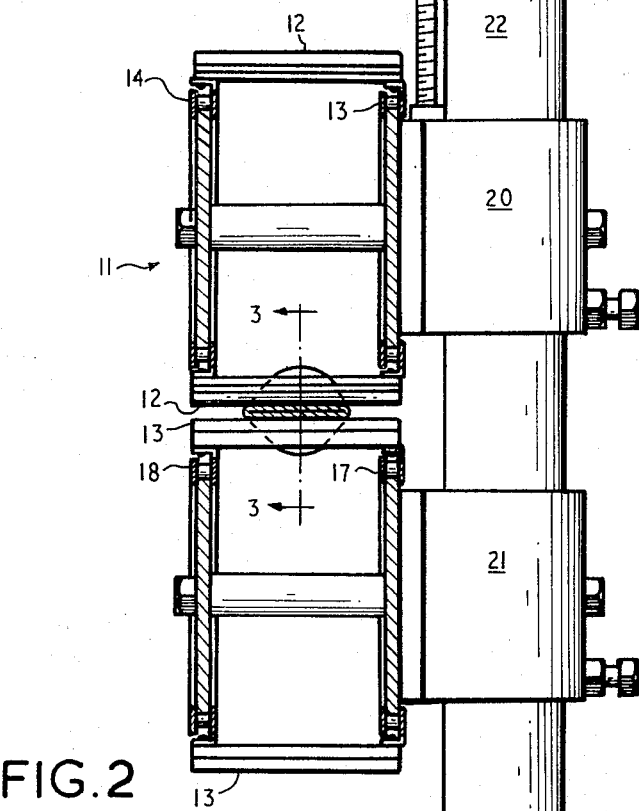

But the invention may be better understood from the following description of a preferred form thereof, taken in conjunction with the accompanying drawings of which:

FIG. 1 is a perspective, partly schematic view of apparatus for producing contractile plastics incorporating the invention, FIG. 2 is a cross sectional view in elevation of a "haul-off device" shown in FIG. 1, and FIG. 3 is a section along the line 3—3 of FIG. 2.

In this description, the term "tubing" is intended to cover not only tubing of circular cross section but also tubing of any other practical profile. It is also intended to include both tubing of circumferentially uniform wall thickness and eccentric tubing of non-uniform wall thickness. Such eccentric tubing may show, in cross-section, a circumferential portion of relatively greater wall thickness and one of relatively lesser wall thickness. The portion of lesser wall thickness will show a greater degree of expansion when the material is transformed to a heat unstable state on the application of internal pressure with heating and will suffer greater contraction if the material is subsequently shrunk to a heat stable state.

Terms of orientation such as "rearward" and "forward" are to be interpreted consistently with the concept of a forward tubing advance.

This description relates to the continuous production of contractile plastics tubing from polyvinyl chloride or like thermoplastic material.

As shown in FIG. 1 tubing 4 of the thermoplastic material is extruded from an extruder denoted generally 5 having a die 6 provided with a mandrel (not shown). The mandrel is apertured to provide a passageway from a compressed air source to the inside of the extruded tubing 4. With suitable metering the internal pressure of the section of tubing nearest the extruder may thus be maintained at any required level. A further section of the tubing 4 remote from the extruder is separately maintained at a higher internal pressure as will be explained. Suitably the portion of tubing 4 closest the extruder 5 at any moment is kept at a pressure sufficient to prevent it from collapsing whilst it is cooled to a more rigid form. Cooling means comprising a cooling bath denoted generally 7 are accordingly provided at this portion of the path of the tubing. (Alternatively the tubing could be air-cooled or cooled by any other appropriate means.) After moderate cooling the tubing is passed through shaping means 8 which partially flatten the tubing to any required degree prior to entering a haul-off device. The shaping means flattens the tube and reduces the amount of air therein before it approaches a haul-off device. The amount of air passing through the haul-off device is thus reduced, as will be described. Shaping means 8 includes two plates 9 and 10 of adjustable separation and having forward and rear edges curved away from the tubing to facilitate the passage of the tubing between the plates. The shaping means may instead comprise a pair of pinch rollers.

The cooled tubing next passes through "haul-off" device 11 enabling separate pressure levels to be maintained forwardly and rearwardly thereof. In general terms this device comprises two or more clamping means which engage the tube, move with it and "haul" it along a short section of its path, and then disengage from it. There is at least one of these clamping means in engagement with the tubing at any one time. Thus before a forwardly moving clamping means disengages from the tubing a second clamping means engages rearwardly of it to follow the same path as the first clamping means.

It is to be noted that a pocket of air between the two clamping means is transported from one pressurized portion of the tubing to the next. It will be obvious also that more than two clamping means may be provided so that more than one pocket of air is being transported at the same instant.

More specifically, and as shown best in FIG. 3 the clamping means may consist of opposed raised pressure pads 12 and 13 on conveyors, mounted along opposite sides of the tubing.

Pads 12 are mounted on a conveyor comprising parallel continuous chains 14 and 15 which move on spigots on a frame denoted generally 16. Similarly pads 13 are mounted on chains 17 and 18 on frame 19. Frames 16 and 19 are attached by means of sleeves 20 and 21 respectively to a fixed vertical column 22. The separation of the frames may be adjusted by unlocking sleeve 20 and rotating a screw 23. The pads 12 and 13 may be of rubber, felt, or any other suitable material.

Pad 13 has a flat contacting surface, whilst pad 12 is of rounded, conveniently semi-circular, cross section. Alternatively pad 12 may be of V section or any other cross section which will enable a good "pinch" grip of the tubing. The opposed pads clamp the tubing, move with it, and then disengage from it to return rearwardly along the return path of the track. The pressure exerted by the pads may be controlled by adjusting the separation of the frames 16 and 19 by means of screw 23 as explained above. The conveyors are driven at a speed consistent with the rate of extrusion and the required tension in the tubing between tracks and extruder. Conveniently each conveyor carries the same number of pads but this is not essential.

From the clamping means the tubing passes to a portion of its path wherein it is maintained under a higher internal pressure. Here it passes firstly through a zone of moderate heating (below the temperature of free flow) where it expands, and subsequently through a refrigerated cooling zone where it sets in an expanded heat unstable stressed condition. These processes which will now be described in detail take place in chambers which are shown only in part and indicated collectively 24 in FIG. 1. After passing through the air pumping haul-off device 11 the temporarily sealed air pockets open and the tubing is passed through a tubular sizing member 4', suitably of metal, which may be tapered internally and which may be perforated with a pattern of holes.

The sizing member 4' may also include a continuous belt which on its forward path moves through the metal tube together with the plastics tubing and provides a sheath around the plastics tubing. The belt on its return path is outside the metal tube and is in flat form. However after passing over a roller at its end nearest the extruder the belt is preformed to a circular shape and enters the metal tube with the plastics tubing, overlays the tubing and conforms in shape to the inside of the metal tube. Guides may be provided to shape the belt to a circular shape before entering the tube. Alternatively the belt may be shaped manually by the operator as it enters. The belt is suitably of polytetrafluoroethylene coated fibre glass. The same effect could also be achieved by providing a plurality of belts or flat tapes to enter the metal tube together, with their edges overlapping, to provide a composite sheath around the plastics tubing. The advantages of these systems over the simple metal tube sizing system are:

(a) seizing and jerking due to friction are largely eliminated,
(b) longitudinal stretch and thus eventual longitudinal shrinkage (usually an undesirable effect) are minimized, and
(c) a better gloss finish is attained.

The first part of the sizing member is totally enclosed in a hot air bath capable of regulation up to a temperature of approximately 150° C. in the case of unplasticized P.V.C. tubing, or in a steam or hot air bath (or in radiant heat from elements etc.) regulated to approximately 95° C. in the case of plasticized P.V.C. tubing (suitable temperatures may be maintained for other plastic materials). Further means may be provided to apply a partial vacuum to the second part of the perforated tubular sizing member so as to assist the positive internal air pressure already inside the plastic tubing to expand the warm tubing into a close continuously sliding contact with the inside diameter of such tubular sizing member as the plastics tubing passes through it in a forward direction. The sizing member may then pass directly into a cooling bath where the plastics tubing is cooled with cold or refrigerated water or brine with or without applied vacuum as required.

After leaving the cooling bath the cooled plastics tubing is passed through another "haul-off" device which may be of the twin-track traction type described previously and/or one or more sets of nip rolls such as rollers 25 capable of controlling the accurate and regular release of air from the tube. Obviously the metal tube does not extend to this last "haul-off" though the belt may. It will be obvious that under equilibrium operating conditions the mass of air to be released from the pressurized tubing will be the same as the mass of air conveyed through the primary traction unit into the pressurized tubing. The expanded heat unstable pressurized tubing may then be cut automatically to any pre-determined length or may be coiled in long lengths.

It will thus be appreciated that the pressure differential between the rearward and forward sides of the clamping means depends on three controlled factors:

(a) The rate at which air is fed into the tube from the extruder (controlled by suitable metering). (In some cases it will be sufficient to feed the air at atmospheric pressure. In other cases increased pressure or withdrawal of air will be necessary to maintain the extruded tube at a desired supporting pressure.)
(b) The rate at which air is conveyed forward through the "haul-off" device (controlled by the number and dimensions of clamping means and the configuration of the tubing immediately prior to entering the "haul-off" device).
(c) The rate at which air is allowed to pass from the expanded portion of the tubing between the nip rollers (controlled by suitable adjustment of the second "haul-off" device).
(d) The rate at which air passes through the "haul-off" may be controlled by controlling the separation of the shaping means.

Proper control of these factors allows continuous production of contractile plastics tubing.

What I claim is:

1. Apparatus for the continuous production of heat shrinkable thermoplastic tubing, said apparatus including a first shaping means for receiving internally pressurized thermoplastic tubing from an extruding and fluid pressurizing means, a conveyor haul-off device comprising two substantially parallel chain conveyors arranged and disposed one above the other, a plurality of individual pressure pads mounted at spaced intervals along the length of each conveyor, each of the pads on one conveyor being aligned with one of said pads on the other conveyor, the pads being adapted to move in pairs at a uniform speed in a direction away from said first shaping means, the respective pairs of pads being adapted for a portion of the tubing travel to engage, grip and temporarily close off at spaced intervals along its length the thermoplastic tubing passing from the first shaping means, said apparatus including forwardly of said conveyor haul-off device, a second shaping means comprising a substantial hollow sizing and shaping member through which said tubing passes from said conveyor haul-off device, said second shaping means including heating means adapted to heat said tubing to a temperature in the range of from about 80° C. to about 150° C., a cooling means forwardly of said heating means, and a second haul-off device forwardly of said sizing means comprising upper and lower rollers in adjustably spaced relationship, said conveyor haul-off device constituting a forwardly pumping air pump and said second haul-off device constituting a controlled fluid release means.

2. Apparatus according to claim 1, wherein the pressure pads on one of said conveyors have a flat clamping surface.

3. Apparatus according to claim 1 wherein the cross section of the pads on the other of said conveyors is semi-circular.

4. Apparatus according to claim 1 including means for introducing fluid into the portion of said tubing rearward of said pressure pads, and means for controlled release of said fluid is forwardly of said pressure pads.

5. The apparatus as claimed in claim 1 wherein said first shaping means and said conveyor haul-off device are adjustable in a vertical plane.

6. The apparatus as claimed in claim 5 wherein the pressure pads are greater in width transversely of the conveyor than in length longitudinally of the conveyor and each pair of said pads has substantially parallel surfaces gripping said tubing.

7. Apparatus according to claim 6 wherein said sizing member includes also one or more endless tapes passing internally of said sizing member, thereby guiding said thermoplastic therethrough and ensuring a smooth passage for said tubing therethrough.

8. Apparatus for the continuous production of heat shrinkable thermoplastic tubing, said apparatus including a first shaping means for receiving internally pressurized thermoplastic tubing from an extruding and fluid pressurizing means, a conveyor haul-off device comprising two substantially parallel chain conveyors arranged and disposed one above the other, a plurality of individual pressure pads mounted at spaced intervals along the length of each conveyor, each of the pads on one conveyor being aligned with one of said pads on the other conveyor, the pads being adapted to move in pairs at a uniform speed in a direction away from said first shaping means, the respective pairs of pads being adapted for a portion of the tubing travel to engage, grip and temporarily close off at spaced intervals along its length the thermoplastic tubing passing from the first shaping means, said apparatus including forwardly of said conveyor haul-off device, a second shaping means comprising a substantial hollow sizing and shaping member through which said tubing passes from said conveyor haul-off device, said second shaping means including heating means adapted to heat said tubing to a temperature in the range of from about 80° C. to about 150° C., a cooling means forwardly of said heating means, and a second haul-off device forwardly of said sizing means comprising upper and lower rollers in adjustably spaced relationship, said conveyor haul-off device constituting a forwardly pumping air pump and said second haul-off device constituting a controlled fluid release means, the pressure pads being greater in width transversely of the conveyor than in length longitudinally of the conveyor and each pair of said pads having substantially parallel surfaces gripping said tubing.

References Cited
UNITED STATES PATENTS

| | | | |
|---|---|---|---|
| 2,760,228 | 8/1956 | Verges | 18—19 TCUX |
| 1,891,744 | 12/1932 | Blair | 264—209 X |
| 2,410,744 | 11/1946 | Powers | 264—173 X |
| 3,035,302 | 5/1962 | Lysobey | 18—14 SUX |
| 3,230,287 | 1/1966 | Caron et al. | 18—4 BX |
| 3,475,522 | 10/1969 | Garibian et al. | 18—4 BX |
| 3,399,095 | 8/1968 | Hyland, Jr. | 264—173 X |

ROBERT L. SPICER, JR., Primary Examiner

U.S. Cl. X.R.

264—209; 425—109, 326, 384, 455